United States Patent [19]

Noguchi et al.

[11] Patent Number: 5,089,317
[45] Date of Patent: Feb. 18, 1992

[54] MAGNETIC RECORDING MEDIUM

[75] Inventors: Hitoshi Noguchi; Shinji Saito; Hiroo Inaba; Hiroshi Ogawa, all of Kanagawa, Japan

[73] Assignee: Fuji Photo Film Co, Ltd., Kanagawa, Japan

[21] Appl. No.: 468,327

[22] Filed: Jan. 22, 1990

[30] Foreign Application Priority Data

Jan. 20, 1989 [JP] Japan .................................. 1-10036
Jan. 25, 1989 [JP] Japan .................................. 1-14012

[51] Int. Cl.$^5$ ............................................... G11B 23/00
[52] U.S. Cl. ..................................... 428/212; 428/323; 428/329; 428/336; 428/694; 428/900
[58] Field of Search ............... 428/694, 900, 323, 329, 428/336

[56] References Cited

U.S. PATENT DOCUMENTS 4,643,941 2/1987 Miyoshi et al. ..................... 428/900
4,851,289 7/1989 Ogawa et al. ...................... 428/900

Primary Examiner—Paul J. Thibodeau
Attorney, Agent, or Firm—Sughrue, Mion, Zinn Macpeak & Seas

[57] ABSTRACT

A magnetic recording medium comprising two or more magnetic layers containing ferromagnetic substance dispersed in a binder provided on a non-magnetic substrate is disclosed, which is characterized in that a ferromagnetic substance whose water content is adjusted within the range of from 0.4 to 2.0 wt. % by moisture conditioning is used in the upper layer of the magnetic layers and a ferromagnetic substance having an water content less than by at least 0.1 wt. % than that of the feromagnetic substance used in the upper layer is used in the lower layer of the magnetic layers.

8 Claims, No Drawings

MAGNETIC RECORDING MEDIUM

FIELD OF THE INVENTION

This invention relates to a magnetic recording medium comprising magnetic layers and a non-magnetic substrate, and more particularly to a magnetic recording medium comprising at least two magnetic layers. More specifically, it relates to a video tape.

BACKGROUND OF THE INVENTION

Magnetic recording media require a high level of various characteristics and many improvements have been made. One of the required characteristics is S/N. To improve the S/N of coating type magnetic tapes, it is required that ferromagnetic substances are uniformly dispersed in binders and the surfaces of coated magnetic layers are made smooth. From this point of view, it is prescribed in JP-A-60-187931 (the term "JP-A" as used herein means an "unexamined published Japanese patent application") that the water content of the ferromagnetic substances is adjusted to 0.8 wt % or higher by moisture conditioning.

Dispersibility and orientation are improved in the above technique, because the water contents of the ferromagnetic substances are not lower than 0.8 wt %. However, water on the surfaces of the ferromagnetic substances reacts with isocyanate compounds in coating solutions, whereby the pot life of the coating solutions is shortened and the surface profile of the resulting coated magnetic tapes is deteriorated. Further, the reaction of the isocyanate compounds is hastened by water and the curing of the coating film is also hastened. Therefore, calender moldability is deteriorated in the production thereof, the surface properties of magnetic tapes are deteriorated and a satisfactory S/N cannot always be obtained.

Recently, high-density recording has been required for magnetic recording media and studies in highly filling the ferromagnetic substances have been made. Investigation of highly filling the ferromagnetic substances can be narrowed down to two points, the pulverization of the ferromagnetic substances and the improvement of the fillability thereof (lower to higher fill of the substances).

In order to improve recording density, high filling and the smoothing of magnetic layers are made and an effort to minimize spacing loss must be made.

Various means for high filling have been studied. As a means thereof, there is known a method wherein a powder compacting treatment (or compacting treatment) is carried out during the course of the preparation of the ferromagnetic substances themselves or a kneading treatment is carried out during the course of the preparation of the coating solutions of the ferromagnetic substances.

The term "powder compacting treatment" (or "compacting treatment") as used herein refers to a crushing (pulverizing) treatment of magnetic powders, which is carried out by using a ball mill, a colloid mill or the like. Namely, it is a means for improving fillability by removing air contained in magnetic powder to lower the bulk of the magnetic powder (namely to increase bulk density).

The term "kneading treatment" as used herein refers to a treatment in which kneading is carried out by using a roll mill, a kneader or the like before the coating solution of magnetic substance is subjected to a dispersion treatment in a dispersion device such as a sand grinder. Namely, it is a means for improving fillability.

It was known for a long time that the compacting treatment or the kneading treatment is effective in improving high filling (namely in improving audio characteristics). For example, compacting kneading treatment is described in *Material*, Vol. 15, No. 150, pages 160 to 165 (1966) and kneading treatment is described in JP-A-59-165237, JP-B-57-42888 (the term "JP-B" as used herein means an "examined Japanese patent publication"), etc.

High filling for high-density recording could be achieved by conventional compacting treatment or kneading treatment. However, the magnetic characteristics of such magnetic recording media are not always improved. There is much difficulty in improving video characteristics (particularly S/N) as well as audio characteristics in the case of video tapes having a multilayer structure in particular.

For example, when the compacting treatment is intensively carried out, magnetic substance is finely divided. However, acicular magnetic substance is broken and acicular ratio is lowered. As a result, squareness ratio and coercive force are lowered and video characteristics (particularly S/N) are deteriorated when a magnetic tape is prepared.

When the kneading treatment is intensively carried out, fillability can be improved. However, when the kneading treatment is conducted to excess, the acicular ratio of the acicular magnetic substance is deteriorated, coercive force is reduced and squareness ratio is lowered. Hence, video characteristics are damaged.

Accordingly, it has been highly desirable to develop a magnetic recording medium having excellent magnetic characteristics, particularly a magnetic recording medium having a multilayer structure, which is excellent in video characteristics as well as audio characteristics even when there are used magnetic substances which have been subjected to the compacting treatment or the kneading treatment for the purpose of high filling.

SUMMARY OF THE INVENTION

An object of the present invention is to provide a magnetic recording medium having improved video characteristics, particularly S/N in a type of magnetic recording medium having a multilayer structure.

Another object of the present invention is to provide a magnetic recording medium which is excellent in video characteristics (particularly S/N) as well as audio characteristics.

The present invention is intended to solve the above-described problems associated with the prior arts as mentioned above, and provides a magnetic recording medium comprising at least two magnetic layers containing ferromagnetic substance dispersed in a binder provided on a non-magnetic substrate, characterized in that a ferromagnetic substance whose water content is adjusted within the range of from 0.4 to 2.0 wt % by moisture conditioning is used in the upper layer of said magnetic layers and a ferromagnetic substance having a water content less by at least 0.1 wt % than that of the ferromagnetic substance used in the upper layer is used in the lower layer of said magnetic layers.

DETAILED DESCRIPTION OF THE INVENTION

Now, the present invention will be illustrated in more detail below.

In the present invention, the water content is a value obtained by measuring water content by Karl Fischer's method. More specifically, the water content is measured by weighing about 1 g of a ferromagnetic substance or a coating solution to be measured and charging it in a water content measuring system of MCI VA-02 and MCI CA-02, produced by MITSUBISHI Co. using Aquamicron "Mitsubishi" as a reagent When the water content of the ferromagnetic substance used in each of the upper layer and the lower layer is adjusted as above, good dispersibility, calender moldability and pot life can be obtained and a magnetic tape having good surface properties and good S/N can be obtained.

The water content of the ferromagnetic substance used in the upper layer is within the range of from 0.4 to 2.0 wt % and preferably from 0.8 to 1.2 wt %. When the water content is less than 0.4 wt %, dispersibility and orientation are poor and S/N is deteriorated, while when the water content is more than 2.0 wt %, kneading cannot be sufficiently carried out and squareness ratio is reduced. The water content of the ferromagnetic substance used in the lower layer is preferably less than 0.8 wt %, more preferably from 0.3 to less 0.8 wt %, and less by at least 0.1 wt % than that of the ferromagnetic substance used in the upper layer. When the water content is not less than 0.8 wt %, the reactivity with isocyanate compounds is increased, pot life and calender moldability are lowered and hence surface properties are deteriorated.

In the present invention, dispersibility and orientation are increased with regard to the upper layer, while calender moldability and pot life are improved with regard to the lower layer, whereby a magnetic recording medium having a high S/N can be obtained. This effect cannot be clearly obtained unless a difference in water content between the ferromagnetic substance used in the upper layer and that used in the lower layer is 0.1 wt % or more.

Further, it is preferred that a ferromagnetic substance having a tap density of from 0.8 to 1.0 is used for the lower layer and a ferromagnetic substance having a tap density of from than 0.7 to 0.9 is used for the upper layer, provided that the tap density of the ferromagnetic substance for the lower layer is higher than that of the ferromagnetic substance for the upper layer by the difference of 0.02 or more. By using such ferromagnetic substances, improved video characteristics as well as improved audio characteristics can be obtained.

There are various means for intensifying the kneading treatment for the high filling of the magnetic substance. Examples thereof include a method wherein the amounts of solvents (including solvents in binders) to be added during kneading are varied, a method wherein the gap between rollers is narrowed so as to apply a powerful force to the kneaded substance, and a method wherein the number of revolutions is increased. Another example includes a method wherein the tap density of the magnetic substance is increased. When the tap density is high, the amount of air contained in the magnetic substance is reduced, bulk is reduced and intense shear can be applied to the kneaded substance (coating solution of magnetic substance).

However, when the compacting treatment is intensively carried out to increase tap density, acicular magnetic substance is broken and acicular ratio is lowered as described above, so when a magnetic tape is prepared, squareness ratio and coercive force are reduced and video characteristics are deteriorated.

Further, when the kneading treatment is intensively carried out, acicular magnetic substance is often broken, the acicular ratio of the magnetic substance is lowered, the coercive force and squareness ratio of the resulting magnetic recording medium is lowered and video characteristics are deteriorated.

Accordingly, it is desirable that the above compacting treatment and kneading treatment are moderately carried out.

Particularly, in video tapes having a multilayer structure, video signals are mainly recorded on the upper magnetic layer. Accordingly, when lowering in squareness ratio or coercive force due to lowering in the acicular ratio of the magnetic substance is caused, video S/N or the frequency characteristic (f characteristic) of RF signal is lowered and various problems (particularly the lowering of video characteristics) are caused, Therefore, the compacting treatment and the kneading treatment of the coating solution of the magnetic substance must be carefully carried out so that the magnetic substance is not broken. Accordingly, it is not desirable that the compacting treatment and the kneading treatment are too intensively carried out. However, if the compacting treatment or the kneading treatment is omitted, the high density of the magnetic layers cannot be obtained (namely, an improvement in audio characteristics cannot be achieved). Hence, it is necessary to conduct moderately the compacting treatment and the kneading treatment.

Generally, video characteristics are highly affected by the acicular ratio of the magnetic substance and the distribution of the coercive force in comparison with audio characteristics. Therefore, the contribution of the lower magnetic layer to video signal is small in comparison with the upper magnetic layer, so that kneading can be intensively conducted by allowing the tap density of the magnetic substance of the lower magnetic layer to be higher than that of the magnetic substance of the upper magnetic layer to improve audio characteristics, that is, fillability.

The present inventors have studied and found that high filling can be achieved and video characteristics as well as audio characteristics can be improved by adjusting the tap density of the magnetic substance used in each of the lower and upper magnetic layers to a value within a specific range.

It is considered that tap density prescribed below is suitable as a standard for estimating the degree of the compacting treatment.

The tap density is measured in the following manner. 40 g of a powder to be measured is weighed in a mess cylinder. The powder together with the messcylinder is allowed to fall 100 times from a height of 30 mm. After falling 100 times (namely after tapping 100 times), the volume of the powder is measured, and tap density per 1 cc is calculated from the following formula.

$$\text{Tap density } (TD) = \frac{40}{\text{Measured volume}} \text{ [g/cc]}$$

When the compacting treatment is intensively conducted, tap density is increased. When tap density is excessively high, the acicular magnetic substance is broken. Further, when tap density is too high, shear is excessively applied during the kneading treatment and the acicular ratio of the acicular magnetic substance is lowered. Accordingly, a proper compacting treatment and a proper kneading treatment are made when the tap density of the magnetic substance after the compacting treatment is set to a value within a suitable range.

With respect to the suitable range of tap density, the tap density of the magnetic substance of the lower magnetic layer is in the range of 0.8 to 1.0, preferably 0.9 to 0.95 and that of the magnetic substance of the upper magnetic layer is in the range of 0.7 to 0.9, preferably 0.75 to 0.85.

It is preferred that the tap density of the magnetic substance of the lower magnetic layer is higher than that of the magnetic substance of the upper magnetic layer, because the degree of filling is allowed to be higher. However, when it is too high, the breaking of the magnetic substance proceeds and audio characteristics are lowered. Accordingly, a difference in tap density between the magnetic substance of the lower magnetic layer and that of the upper magnetic layer is at least 0.02, and preferably not larger than 0.15.

Any ferromagnetic substances can be used in the present invention without particular limitation. Examples of the ferromagnetic substances include metal oxide substances such as ferromagnetic iron oxide and metal oxides containing Co, for example, Co-containing ferromagnetic iron oxide (e.g., $\gamma$-Fe$_2$O$_3$, Co-containing (Co-deposited, modified or doped) $\gamma$-Fe$_2$O$_3$, Fe$_3$O$_4$, Co-containing (Co-deposited, modified or doped) Fe$_3$O$_4$, FeOx, Co-containing (CO-deposited, modified or doped) FeOx (wherein X=1.33 to 1.50), CrO$_2$, CrO$_2$ containing at least one member of Rn, Te, Sb, Sr, Fe, Ti, V, Mn and Cr$_2$O$_3$, etc.); alloys and simple metallic substances such as alloys composed of at least 75 wt % of a metallic component wherein at least 80 wt % of said metallic component is composed of at least one ferromagnetic metal or alloy (e.g., Fe, Co, Ni, Fe-Co, Fe-Ni, Co-Ni, Co-Ni-Fe, Co-Ni-P, Co-Ni-Fe-B, Fe-Ni-Zn, Fe-Co-Cr) and optionally not more than 20 wt % of the metal component is composed of other component (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, P); other metallic compounds such as iron nitride or alloys containing hydroxide or oxide; and mixtures thereof.

Examples of processes for producing ferromagnetic alloy powders include the following methods.

(a) A method wherein composite salts of organic acids (mainly oxalate) are reduced with a reducing gas such as hydrogen.

(b) A method wherein iron oxide is reduced with a reducing gas such as hydrogen to obtain Fe or Fe-Co particle.

(c) A method wherein metal carbonyl compounds are thermally decomposed.

(d) A method wherein a reducing agent such as sodium boron hydride, a hypophosphite or hydrazine is added to an aqueous solution of a ferromagnetic metal to carry out reduction.

(e) A method wherein ferromagnetic metal powder is precipitated by electrolysis using a mercury cathode and then separated from mercury.

(f) A method wherein metal is evaporated in an inert gas atmosphere under low pressure to obtain fine powder.

There is no particular limitation with regard to the shape of ferromagnetic alloy powder to be used. Generally, needle, granular, die, rice grain or plate form is used. The ferromagnetic alloy powder has a specific surface area ($S_{BET}$) of at least 35 m$^2$/g, preferably at least 40 m$^2$/g, more preferably at least 45 m$^2$/g.

Platy hexagonal system barium ferrite can also be used as ferromagnetic substance in the present invention. Barium ferrite has such particle size that its diameter is from about 0.001 to 1.0 $\mu$ and its thickness is $\frac{1}{2}$ to 1/20 of the diameter. Barium ferrite has specific gravity of 4 to 6 g/cc and a specific surface area of 1 to 70 m$^2$/g.

If desired, dispersant, lubricant, antistatic agent, etc. described hereinafter may be adsorbed on the surfaces of these ferromagnetic substances by immersing them in solvents before they are dispersed in coating solutions.

It is preferred that the ferromagnetic substance used in the upper layer has a coercive force larger than that of the ferromagnetic substance used in the lower layer, the ferromagnetic substance of the upper layer has a specific surface area (as measured by BET method) which is larger than that of the ferromagnetic substance of the lower layer, and the average major axis and crystallite size of the ferromagnetic substance of the upper layer are smaller than those of the ferromagnetic substance of the lower layer.

It is particularly preferred that the magnetic substance used in the lower layer has a coercive force of not smaller than 600 Oe, a specific surface area ($S_{BET}$) of not larger than 45 m$^2$/g and a crystallite size of not smaller than 290 Å and the magnetic substance used in the upper layer has a coercive force of not larger than 1000 Oe, a $S_{BET}$ of not smaller than 30 m$^2$/g and a crystallite size of not larger than 400 Å. Co-modified $\gamma$-FeOx (x=1.33 to 1.50) is particularly preferred.

Water content within the range specified in the present invention can be provided to the ferromagnetic substances without using any novel method. For example, water content can be adjusted in a stage for the preparation of ferromagnetic iron oxide containing Co. Namely, it is possible to control water content in a drying stage in a method comprising depositing a cobalt compound on the surface of magnetic iron oxide powder and then carrying out water washing, filtration and drying. If desired, a moisture conditioning stage may be provided as an after-stage.

The water contents of coating solutions are in the range of 0.00 to 0.50% by weight when these ferromagnetic substances are used. It is preferred that these ferromagnetic substances contain not more than 1% by weight of heavy metals such as Sr, Pb, Mn, Ni, Cd, Cr, Al, Si, Ti, Cu, Zn, etc. If desired, alumina, etc. may be deposited on or fused with these ferromagnetic substances.

The upper magnetic layer generally contains the ferromagnetic substance generally in an amount of not more than 8 g/m$^2$, preferably not more than 5 g/m$^2$ and more preferably not more than 3 g/m$^2$. The lower magnetic layer generally contains the ferromagnetic substance generally in an amount of from 8 to 25 g/m$^2$ and preferably from 10 to 15 g/m$^2$.

The upper layer has a thickness of preferably not greater than 1.5 $\mu$, more preferably not greater than 1.0 $\mu$, and most preferably not greater than 0.5 $\mu$. The lower layer has a thickness of preferably from 2 to 5 $\mu$ and more preferably from 2.5 to 3.5 $\mu$.

A coating system of coating two or more layers simultaneously (hereafter referred to as "co-multilayer coating") as described in JP-A-62-124631 may be used as a coating system.

Conventional thermoplastic resins, thermosetting resins, reactive resins and mixtures thereof can be used as binders used for magnetic layers, and back layers optionally provided, in the present invention.

Thermoplastic resins having a softening temperature of not higher than 150° C., an average molecular weight of 10,000 to 30,000 and a degree of polymerization of about 50 to 2,000 can be used. Examples of the thermoplastic resins include vinyl chloride-vinyl acetate copolymer, vinyl chloride copolymer, vinyl chloride-vinylidene chloride copolymer, vinyl chloride-acrylonitrile copolymer, acrylic ester-acrylonitrile copolymer, acrylic ester-vinylidene chloride copolymer, acrylic ester-styrene copolymer, methacrylic ester-acrylonitrile copolymer, methacrylic ester-vinylidene chloride copolymer, methacrylic ester-styrene copolymer, urethane elastomer, nylon-silicone resin, nitrocellulose-polyamide resin, polyvinyl fluoride, vinylidene chloride-acrylonitrile copolymer, butadiene-acrylonitrile copolymer, polyamide resin, polyvinyl butyral, cellulose derivative (e.g., cellulose acetate butyrate, cellulose diacetate, cellulose triacetate, cellulose propionate, nitrocellulose, ethyl cellulose, methyl cellulose, propyl cellulose, methyl ethyl cellulose, carboxymethyl cellulose, acetyl cellulose), styrene-butadiene copolymer, polyester resin, chlorovinyl ether-acrylic ester copolymer, amino resin, synthetic rubber and mixtures thereof.

As the thermosetting resins or the reactive resins, there can be used those which have a molecular weight of not larger than 200,000 in the form of coating solutions and whose molecular weight becomes infinitely great by reaction such as condensation reaction, addition reaction or the like when heated after coating and drying. Among these resins, there are preferred the resins which are not softened or molten till the resins are heat-decomposed. Concrete examples of the resins include phenolic resin, phenoxy resin, epoxy resin, curable polyurethane resin, urea resin, melamine resin, alkyd resin, silicone resin, reactive acrylic resin, epoxy-polyamide resin, nitrocellulose-melamine resin, a mixture of a high-molecular polyester resin and isocyanate prepolymer, a mixture of a methacrylate copolymer and diisocyanate prepolymer, a mixture of a polyester polyol and a polyisocyanate, urea-formaldehyde resin, a mixture of a low-molecular glycol, a high-molecular diol and triphenylmethane triisocyanate, polyamine resin, polyimine resin and a mixture thereof.

These binders may be used either alone or in combination. In addition to the binder, additives may be used. With regard to the mixing ratio of the magnetic substance and the binder in the magnetic layers, the binder is used in an amount of 5 to 300 parts by weight per 100 parts by weight of the magnetic substance. With regard to the mixing ratio of fine powder of a backing layer and the binder, the binder is used in an amount of 30 to 300 parts by weight per 100 parts by weight of fine powder. Examples of the additives include dispersant, lubricant, abrasive, antistatic agent, antioxidant, solvent, etc.

These thermoplastic resins, thermosetting resins and reactive resins may have, in addition to principal functional groups, further one to six kinds of functional groups such as acid groups, for example, carboxyl group, sulfinic acid group, sulfo group, phosphoric acid group, sulfuric acid group, sulfuric ester group, phosphoric ester group and alkyl ester group thereof and amino acid group; ampholytic groups, for example, aminosulfonic acid group, sulfuric or phosphoric ester group of aminoalcohol and alkylbetaine group; amino group, imino group, imido group and amido group; hydroxyl group; alkoxyl group; thiol group; halogen group; silyl group; and siloxane group. It is preferred that each functional group is contained in an amount of $1 \times 10^{-6}$ eq to $1 \times 10^{-2}$ eq per one gram of resin.

Examples of polyisocyanates which are used in the present invention include tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, triphenylmethane triisocyanate, products of these isocyanates with polyhydric alcohols and dimers to decamers of polyisocyanates formed by the condensation of these isocyanates. These polyisocyanates have preferably an average molecular weight of 100 to 20,000. Among these polyisocyanates, Coronate L, Coronate HL, Coronate 2030, Coronate 2031, Millionate MR, Millionate MTL (products of Nippon Polyurethane KK); Takenate D-102, Takenate D-110N, Takenate D-200, Takenate D-202, Takenate 300S, Takenate 500 (products of Takeda Chemical Industries, Ltd.); and Sumidur T-80, Sumidur 44S, Sumidur PF, Sumidur L, Sumidur N, Desmodur L, Desmodur IL, Desmodur N, Desmodur HL, Desmodur T-65, Desmoduer 15, Desmodur R, Desmodur RF, Desmodur SL and Desmodur Z4273 (products of Sumitomo Bayer KK) are commercially available. These polyisocyanates may be used either alone or in a combination of two or more of them by utilizing a difference in curing reactivity therebetween.

The polyisocyanate is preferably contained in an amount of from 10 to 60 % by weight, more preferably from 20 to 50 % by weight, based on the weight of the binder.

Compounds having hydroxyl group (e.g., butanediol, hexanediol) or amino group (e.g., monomethylamine, dimethylamine, trimethylamine) or metal oxides as catalysts may be used together with the polyisocyanates to expedite a curing reaction. Among these compounds having hydroxyl group or amino group, polyfunctional compounds are preferred.

Carbon blacks which can be used for the magnetic layers and back layers of the present invention include furnace black for rubber, thermal black for rubber, carbon black for color and acetylene black. Examples of abbreviations which are used for these carbon blacks in U.S.A. include SAF, ISAF, IISA, F, T, HAF, SPF, FF, FEF, HMF, GPF, A, PF, SRF, MPF, ECF, SCF, CF, FT, MT, HCC HCF, MCF, LFF, RCF. Carbon blacks which are classified according to ASTM D-1765-82a in U.S.A. can be used. Carbon blacks which are used in the present invention have an average particle size of 5 to 1000 m$\mu$ (electron microscope), a nitrogen adsorption surface area of 1 to 800 m$^2$/g, a pH of 4 to 11 (according to JIS K-6221-1982 method) and a dibutyl phthalate (DBP) oil adsorption of 10 to 800 ml/100 g (according to JIS K-6221-1982 method).

In the present invention, carbon black having a particle size of 5 to 1000 m$\mu$ is used when the surface electric resistance of coating film is to be lowered. Carbon black having a particle size of 50 to 1000 m$\mu$ is used when the strength of coating film is to be controlled. Carbon black having a fine size (not larger than 100 m$\mu$) is used for the purpose of controlling the surface roughness of coating film and smoothing the surface thereof to reduce spacing loss. Coarse carbon black particle (not smaller than 50 mμ) is used for the purpose of roughening the surface of coating film to lower a coefficient of friction. The types and amounts of carbon blacks to be used are chosen according to the purposes of magnetic recording media.

The surfaces of these carbon blacks may be treated with dispersants described hereinafter. Resins may be grafted onto carbon blacks. Carbon black may be treated at an oven temperature of not lower than 2,000° C. during the course of the manufacturing thereof to graphatize part of the surface of carbon black. Hollow carbon black can be used as specific carbon black.

Carbon black is used in an amount of preferably 0.1 to 20 parts by weight per 100 parts by weight of magnetic substance when carbon black is used in the magnetic layer. Examples of carbon blacks which can be used in the present invention are described in, for example, *Handbook of Carbon Black*, edited by the Society of Carbon Black (1971).

It is preferred that carbon black having an average particle diameter of smaller than 20 mμ is used in an amount of 1 to 20 parts by weight per 100 parts by weight of the magnetic substance in the lower magnetic layer, while carbon black having an average particle diameter of 40 to 80 mμ is used in an amount of 0.1 to 10 parts by weight per 100 parts by weight of the magnetic substance in the upper magnetic layer.

Any of conventional materials having an abrasive effect can be used as abrasives used in the magnetic layers and backing layers of the present invention. Examples of the abrasives include α-alumina, γ-alumina, α-γ-alumina, fused alumina, silicon carbide, chromium oxide, cerium oxide, corundum, artificial diamond, α-iron oxide, garnet, emery (principal components: corundum and magnetite), garnet group, siliceous stone, silicon nitride, boron nitride, molybdenum carbide, boron carbide, tungsten carbide, titanium carbide, tripoli, diatomaceous earth and dolomite. These materials having a Mohs' hardness of not lower than 6 are chiefly used either alone or in a combination of two to four members of them. The abrasives have an average particle size of 0.005 to 5 μ, preferably 0.01 to 2 μ. The abrasives are used in an amount of 0.01 to 20 parts by weight per 100 parts by weight of the binder.

It is preferred that the abrasives having a Mohs' hardness of lower than 7 are used in the lower magnetic layer, while the abrasives having a Mohs' hardness of not lower than 7 are used in the upper magnetic layer.

Examples of lubricants which are used in the magnetic layers and backing layers of the present invention include fine inorganic powders such as molybdenum disulfide, boron nitride, fluorinated graphite, calcium carbonate, barium sulfate, silicon oxide, titanium oxide, zinc oxide, tin oxide and tungsten disulfide; fine resin powders such as fine powders of acrylic styrene resins, benzoguanamine resins, melamine resins, polyolefin resins, polyester resins, polyamide resins, polyimide resins and polyfluoroethylene resins; and organic compound lubricants such as silicone oil, fatty acid-modified silicone oil, graphite, fluorinated alcohols, polyolefins (e.g., polyethylene wax), polyglycols (e.g., polyethylene oxide wax), tetrafluoroethylene oxide wax, polytetrafluoroglycol, perfluorofatty acids, perfluorofatty acid esters, perfluoroalkylsulfuric esters, perfluoroalkylphosphoric acid esters, alkylphosphoric acid esters, polyphenyl ether, fatty acid esters derived from a monobasic fatty acid having from 10 to 20 carbon atoms and a monohydric alcohol having from 3 to 12 carbon atoms or one or more members selected from the group consisting of a dihydric alcohol, a trihydric alcohol, a tetrahydric alcohol and a hexahydric alcohol and fatty acid esters derived from a monobasic fatty acid having not less than 10 carbon atoms and a monohydric to hexahydric alcohol in such a proportion that the sum total of carbon atoms of the fatty acid and the alcohol is 11 to 28. Further, fatty acids or fatty acid amides having from 8 to 22 carbon atoms and aliphatic alcohols can be used. Concrete examples of the organic compound lubricants include butyl caprylate, octyl caprylate, ethyl laurate, butyl laurate, octyl laurate, butyl myristate, octyl myrystate, ethyl palmitate, butyl palmitate, octyl palmitate, ethyl stearate, butyl stearate, octyl stearate, amyl stearate, anhydrosorbitan monostearate, anhydrosorbitan distearate, anhydrosorbitan tristearate, anhydrosorbitan tetrastearate, oleyl oleate, oleyl alcohol and lauryl alcohol. These compounds may be used either alone or in combination. Further, lubricating additives may be used either alone or in combination. Examples of the lubricating additives include antioxidant (e.g., alkylphenol), rust inhibitor (e.g., naphthenic acid, alkenylsuccinic acid, dilauryl phosphate), oil (colza oil, lauryl alcohol), extreme pressure additive (e.g., dibenzyl sulfide, tricresyl phosphate, tributyl phosphite), detergent, viscosity index improver, pour point depressant and anti-foaming agent. These lubricating additives are used in an amount of 0.05 to 20 parts by weight per 100 parts by weight of the binder.

Examples of the dispersants which are used in the present invention include fatty acids having from 10 to 22 carbon atoms ($R_1COOH$ wherein $R_1$ is an alkyl group having from 9 to 21 carbon atoms) such as caprylic acid, capric acid, lauic acid, myristic acid, palmitic acid, stearic acid, oleic acid, elaidic acid, linoleic acid, linolenic acid and stearolic acid; metallic soaps such as alkali metal salts (Li, Na, K, $NH_4^+$, etc.) of the fatty acids, alkaline earth metal salts (Mg, Ca, etc.), Cu salts, Pb salts, etc. of the fatty acids and fatty acid amides; and lecithin. In addition to these compounds, higher alcohols having not less than 4 carbon atoms (e.g., butanol, octyl alcohol, myristyl alcohol, stearyl alcohol), sulfuric esters and phosphoric esters derived from these alcohols and amine compounds thereof can be used. Further, polyethylene oxide, sulfosuccinic acid and sulfosuccinic esters can also be used. These dispersants are generally used either alone or in a combination. The dispersants are used in an amount of 0.05 to 20 parts by weight per 100 parts by weight of the binder. These dispersants may be allowed to be previously adsorbed by the surface of the magnetic substance or non-magnetic fine powder, or may be added during the course of dispersion.

Examples of antistatic agents which are used in the present invention include electrically conductive powders such as graphite, carbon black, carbon black graphite polymer, tin oxide-antimony oxide, tin oxide and titanium oxide-tin oxide-antimony oxide; natural surfactants such as saponin; nonionic surfactants such as alkylene oxides, glycerins, glycidols, polyhydric alcohols, polyhydric alcohol esters and adducts of ethylene oxide to alkylphenols; cationic surfactants such as higher alkylamines, cyclic amines, hydantoin derivatives, amidoamines, ester amides, quaternary ammonium salts, pyridine and other heterocyclic compounds, phosphoniums and sulfoniums; anionic surfactants having acid radical such as carboxyl group, sulfo group, phosphoric acid group, sulfuric ester group and phosphoric ester group; and ampholytic surfactants such as amino acids, aminosulfonic acids, aminoalcohol sulfates or phosphates and alkylbetaine compounds.

These surfactants may be used either alone or as a mixture thereof. These surfactants are used in an amount of 0.01 to 10 parts by weight per 100 parts by weight of the magnetic substance in the magnetic recording medium. These surfactants are generally used as antistatic agents, but they are often used for other purposes, for example, for the purpose of improving dispersion, magnetic characteristics and lubricity or they are often used as coating aid.

Examples of organic solvents which are used in the dispersion, kneading and coating stages of the present invention include ketones such as acetone, methyl ethyl ketone, methyl isobutyl ketone, cyclohexanone, isophorone and tetrahydrofuran; alcohols such as methanol, ethanol, propanol, butanol, isobutyl alcohol, isopropyl alcohol and methylcyclohexanol esters such as methyl acetate, ethyl acetate, butyl acetate, isobutyl acetate, isopropyl acetate, ethyl lactate and glycol acetate monoethyl ether; ethers such as diethyl ether, tetrahydrofuran, glycol dimethyl ether, glycol monoethyl ether and dioxane; tar (hydrocarbons) such as benzene, toluene, xylene, cresol, chlorobenzene and styrene; chlorinated hydrocarbons such as methylene chloride, ethylene chloride, carbon tetrachloride, chloroform, ethylene chlorohydrin and dichlorobenzene; N,N-dimethylformaldehyde and hexane. These solvents may be used in arbitrary ratios.

The magnetic layer can be formed by dissolving a combination of components described above in the organic solvent, coating the resulting coating solution on a substrate and drying it.

The thickness of the substrate is 2.5 to 100 $\mu$, preferably 3 to 70 $\mu$ when the magnetic recording medium is a tape. Examples of materials for the substrate include polyesters such as polyethylene terephthalate and polyethylene naphthalate; polyolefins such as polypropylene; cellulose derivatives such as cellulose triacetate and cellulose diacetate; vinyl resins such as polyvinyl chloride; other plastics such as polycarbonates, polyamides and polysulfone; metals such as aluminum and copper; and ceramics such as glass. The substrates may be subjected to corona discharge treatment, plasma treatment, priming treatment, heat treatment, dust-resistant treatment, metallizing treatment or alkaline treatment before coating.

With regard to kneading, the order of components to be added may be arbitrarily determined without particular limitation. Coating materials for the magnetic layers and the backing layers can be prepared by using conventional kneaders such as twin-roll mill, three-roll mill, ball mill, pebble mill, trommel mill, sand grinder, Szegvari attritor, high-speed impeller, dispersing mixer, high-speed stone mill, high-speed impact mill, dispersion mill, kneader, high-speed mixer, ribbon blender, Co-kneader, intensive mixer, tumbler, blender, disperser, homogenizer, single screw extruder, twin-screw extruder and ultrasonic dispersing mixer. Kneading dispersion is described in more detail in T. C. Patton, *Patton, Paint Flow and Pigment Dispersion* (1964, John Wiley & Sons), Shinichi Tanaka, *Industrial Material*, Vol. 25, 37 (1977) and literature cited therein, and U.S. Pat. Nos. 2,581,414 and 2,855,156. Kneading dispersion can be conducted in the present invention according to the methods described in this literature to prepare magnetic coating materials and coating materials for the backing layer.

The substrates can be coated with the magnetic layers and the backing layers by means of air doctor coating, blade coating, air knife coating, squeeze coating, dip coating, reverse roll coating, transfer roller coating, gravere coating, kiss roll coating, cast coating or spray coating. If desired, other coating methods may be used. These coating methods are described in detail in *Coating Engineering*, pages 253-277 (March 20, 1971) published by Asakura Shoten.

In this way, the magnetic layers are coated on the substrate. If desired, magnetic substances in the magnetic layers are orientated while immediately drying. Thereafter, the formed magnetic layers are dried. In this drying stage, the substrate is generally conveyed at a conveying rate of 10 m/min to 1,000 m/min, and drying temperature is adjusted to from 20° to 130° C. If desired, surface smoothing processing may be conducted, or cutting into a desired shape may be conducted to prepare the magnetic recording medium of the present invention. It is preferred to carry out continuously stages of surface treatment of filler, kneading-dispersion, coating, heat treatment, calendering, radiation (electron beam) irradiation treatment, surface polishing treatment and cutting in the production of the magnetic recording medium of the present invention. If desired, these stages may be separately carried out or may be divided into some groups.

Temperatures and humidity are controlled in these stages. The temperature is in the rage of 10° to 130° C. and humidity is in the range of 5 to 20 mg/m$^3$ in terms of moisture in air. For example, these matters are described in JP-B-40-23625, JP-B-39-28368 and U.S. Pat. No. 3,473,960. It is considered that the method described in JP-B-41-13181 is a basic, important technique in this field.

The present invention is further illustrated in the following examples. It is to be noted that many modification with regard to components, ratios, operation order, etc. can be made to the method described above and that all such modifications are considered to be well in the spirit and scope of this invention. Accordingly, the following examples are not to be construed as limiting the invention in any way. Parts given in the following examples and comparative examples are by weight unless otherwise stated.

EXAMPLE 1

| Coating Solution A (upper layer) | |
| --- | --- |
| Cobalt-containing iron oxide (water content given in Table 1) (coercive force: 690 Oe, average major axis diameter: 0.2$\mu$, crystallite size: 330 Å) | 100 parts |
| Vinyl chloride-vinyl acetate copolymer (carboxyl group content: 0.5%, a degree of polymerization: 420) | 15 parts |
| Polyester polyurethane (carboxyl group content: 0.3%) | 5 parts |
| Oleic acid | 2 parts |
| Butyl stearate | 1 part |
| Electrically conductive carbon black (0.05$\mu$) | 3 parts |
| α-Alumina (0.4$\mu$) | 3 parts |
| Methyl ethyl ketone/cyclohexane = 7/3 solvent | 200 parts |
| Coating Solution a (lower layer) | |
| Cobalt-containing iron oxide (water content given in Table 1) | 100 parts |

(coercive force: 640 Oe, average
major axis diameter: 0.24μ,
crystallite size: 450 Å)

The characteristics thereof are shown in Table 1.

In Samples No. 14 and No. 15, a magnetic layer composed of a single layer having a dry thickness of 4.0 μm was provided as shown in Table 1.

TABLE 1

| Sample | Upper Layer | | Lower Layer | | Squareness Ratio of Upper Layer | Video S/N (dB) | Ra (nm) |
|---|---|---|---|---|---|---|---|
| | Formu-lation | Water Content (%) | Formu-lation | Water Content (%) | | | |
| 1 | A | 0.9 | a | 0.1 | 0.88 | +2.2 | 5.0 |
| 2 | A | 0.9 | a | 0.3 | 0.88 | +2.3 | 4.8 |
| 3 | A | 0.9 | a | 0.5 | 0.88 | +2.5 | 4.6 |
| 4 | A | 0.9 | a | 0.7 | 0.88 | +2.5 | 4.7 |
| 5* | A | 0.9 | a | 0.9 | 0.88 | +1.9 | 5.8 |
| 6* | A | 0.9 | a | 1.2 | 0.88 | +1.5 | 6.8 |
| 7* | A | 0.3 | a | 0.5 | 0.78 | +1.5 | 5.0 |
| 8* | A | 0.5 | a | 0.5 | 0.82 | +1.9 | 5.1 |
| 9 | A | 0.8 | a | 0.5 | 0.88 | +2.6 | 5.2 |
| 10 | A | 1.0 | a | 0.5 | 0.87 | +2.5 | 5.3 |
| 11 | A | 1.2 | a | 0.5 | 0.86 | +2.4 | 5.4 |
| 12 | A | 1.5 | a | 0.5 | 0.85 | +2.3 | 5.5 |
| 13* | A | 2.3 | a | 0.5 | 0.79 | +1.8 | 5.5 |
| 14* | A | 0.9 | — | —(single layer) | 0.88 | +1.8 | 5.9 |
| 15* | a | 0.5 | — | —(single layer) | 0.78 | +0.0 | 5.2 |

*Comparison
Note:
Squareness Ratio of Upper Layer
A tape having a single layer composed of the upper layer was prepared, and Br/Bm was determined with Hm = 5 KOe by using a vibrating sample type flux meter (manufactured by Toei Kogyo KK).
Video S/N
Noise meter (925C) (manufactured by Shibasoku KK) was used. The tape of Sample No. 15 was referred to as reference tape and a difference in S/N was determined. Noise level was measured by using high pass filter (10 KHz), and low pass filter (4 MHz) VTR which was used was NV-8300 manufactured by Matushita Electric Industrial Co., Ltd

| | |
|---|---|
| Vinyl chloride-vinyl acetate copolymer (carboxyl group content: 0.5%, a degree of polymerization: 420) | 15 parts |
| Polyester polyurethane | 5 parts |
| Oleic acid | 2 parts |
| Butyl stearate | 1 part |
| Electrically conductive carbon black (0.05μ) | 3 parts |
| Methyl ethyl ketone/cyclohexane = 7/3 solvent | 200 parts |

The components of each of the above two coating materials were kneaded in a continuous type kneader and then dispersed by using a sand mill. 5 Parts of polyisocyanate was added to the resulting dispersion for the coating solution of the lower layer, and 6 parts of polyisocyanate was added to the dispersion for the coating solution of the upper layer. 40 Parts of butyl acetate was added to each dispersion. Each of the dispersions was filtered through a filter having an average pore size of 1 μm to prepare a coating solution for the lower magnetic layer and a coating solution for the upper magnetic layer, respectively.

Co-multilayer coating was carried out in such a manner that the resulting coating solution for the lower magnetic layer was coated on the surface of a polyethylene terephthalate of 15 μm in thickness in such an amount as to give a dry thickness of 3.0 μm, and immediately thereafter the coating solution for the upper layer was coated thereon in such an amount as to give the upper magnetic layer of 1.0 μm in thickness. While both layers were still in a wet state, orientation was carried out by using a cobalt magnet having a magnetic force of 3000 G and a solenoid having a magnetic force of 1500 G. The coated substrate was dried and then processed by using a seven-roll calender composed of only metal rolls at a temperature of 120° C. and then slit it into tapes of ½ inches in width, thus preparing video tapes. In this way, tapes as samples No. 1 to 13 were prepared.

In the measurement of Ra by using surface roughness tester SE3AK (manufactured by Kosaka Kenkyusho), center line average roughness Ra was calculated according to JIS B0601. Cut off was 0.25 mm.

As shown in Table 1, video tapes according to the present invention have a high squareness ratio, good video S/N and small surface roughness Ra.

EXAMPLES 2 TO 8 AND REFERENCE EXAMPLES 1 TO 8

Magnetic Substance A (Co-containing $\gamma$-$Fe_2O_3$):
  Hc: 700 Oe
  water content: 0.55 wt %
Tap density(TD): 0.65
  Specific surface area (BET method) 40 m²/g
Magnetic Substance B (Co-containing $\gamma$-$Fe_2O_3$):
  Hc: 650 Oe
  Water content: 0.4 wt %
  Tap density (TD): 0.75
  Specific surface area (BET method): 30 m²/g
Magnetic Substance C (Co-containing $\gamma$-$Fe_2O_3$):
  Hc: 710 Oe
  Water content: 0.7 wt %
  Tap density (TD): 0.72
  Specific surface area (BET method): 48 m²/g The above magnetic substances A to C were subjected to compacting treatment under the following compacting conditions. Tap density of each of the resulting magnetic substances is shown in Table 2.
Compacting Conditions:
  Device used: Sand mill MPUV05 (manufactured by Matsumoto Tekko)
  Amount charged: 1 kg
  Number of revolutions: 20 rpm
  Treatment pressure: given in Table 2
  Treatment time: given in Table 2

Magnetic substance coating solutions having the following formulation were prepared by using magnetic substances having top density given in Table 2.

| Coating Solution for Lower Magnetic Layer | |
|---|---|
| Co-containing γ-Fe₂O₃ (given in Table 2) | 100 parts |
| Vinyl chloride/vinyl acetate/maleic acid copolymer (86:13:1 by weight, a degree of polymerization: 400) | 11 parts |
| Polyester polyurethane resin | 6 parts |
| Carbon black (average particle size: 18 mμ) | 10 parts |
| α-Fe₂O₃ (average particle size: 0.5 μm, Mohs' hardness: 5) | 10 parts |
| Butyl stearate | 1 part |
| Stearic acid | 1 part |
| Butyl acetate | 200 parts |
| Cyclohexanone | 40 parts |
| Coating Solution for Upper Magnetic Layer | |
| Co-containing γ-Fe₂O₃ (given in Table 2) | 100 parts |
| Vinyl chloride/vinyl acetate/maleic acid copolymer (86:13:1 by weight, a degree of polymerization: 400) | 11 parts |
| Polyester polyurethane resin | 8 parts |
| Carbon black (average particle size: 80 mμ) | 5 parts |
| α-Al₂O₃ (average particle size: 0.3 μm, Mohs' hardness: 9) | 8 parts |
| Butyl stearate | 15 parts |
| Stearic acid | 3 parts |
| Butyl acetate | 200 parts |
| Methyl ethyl ketone | 60 parts |

The components of each of the above two coating materials were kneaded in an open kneader (manufactured by Moriyama Seisakusho) (kneading load peak power: given in Table 2) and then dispersed by using a sand grinder.

6 parts of polyisocyanate and 40 parts of butyl acetate were added to each of the resulting dispersions. The resulting dispersions were filtered through a filter having an average pore size of 1 μm to prepare a coating solution for the lower magnetic layer and a coating solution for the upper magnetic layer.

The viscosity of each of the magnetic coating materials was adjusted. The coating solutions were then coated on the surface of a non-magnetic polyethylene terephthalate substrate of 15 μm in thickness in such an amount as to give the lower magnetic layer having a dry thickness of 3.5 μm and the upper magnetic layer having a dry thickness of 0.6 μm by means of single layer coating (for the following measurement of squareness ratio and saturation magnetic flux density) or multilayer coating (for the following measurement of audio sensitivity). The coated substrate as such was orientated in a magnetic field by using a magnet of 3000 gauss, dried and calendered to prepare a magnetic recording medium. The medium was slit into tapes of ½ inches in width to prepare video tapes having a surface roughness Ra of 9 to 12 nm. The characteristics of the resulting tapes were evaluated in the following manner. The results are shown in Table 2.

Evaluation Method (1) Audio Sensitivity

Sine wave signal of 1 KHz was recorded at normal input level by applying normal bias. Reproducing output level was measured by a level meter, and a difference between the measured value and normal output level was represented by dB.

(2) Squareness Ratio (SR)

$$\text{Squareness ratio } (SR) = \frac{\text{Residual Magnetic Flux Density } (Br)}{\text{Saturated Magnetic Flux Density } (Bm)}$$

The ratio was determined with Hm = 5 KOe by using a vibration sample type flux meter manufactured by Toei Kogyo KK.

(3) Saturated Magnetic Flux Density (Bm)

Measurement was made in the same way as in the measurement of squareness ratio (SR).

TABLE 2

| | Lower Magnetic Layer | | | | | | | |
|---|---|---|---|---|---|---|---|---|
| | Kind of Magnetic Substance | Compacting Treatment | | Tap Density (g/cc) | Coercive Force (Oe) | Specific Surface Area (m²/g) | Crystallite Size (Å) | Kneading Load Peak Power (kW) |
| | | Pressure (kg) | Time (min) | | | | | |
| Example 2 | B | 30 | 10 | 0.80 | 642 | 30 | 385 | 0.6 |
| Example 3 | B | 40 | 10 | 1.00 | 625 | 33 | 368 | 0.8 |
| Example 4 | B | 30 | 15 | 0.85 | 636 | 31 | 392 | 0.7 |
| Example 5 | B | 30 | 15 | 0.85 | 636 | 31 | 392 | 0.7 |
| Example 6 | B | 30 | 10 | 0.80 | 642 | 30 | 385 | 0.6 |
| Example 7 | B | 30 | 15 | 0.85 | 636 | 31 | 392 | 0.7 |
| Example 8 | A | 40 | 10 | 0.90 | 666 | 41 | 291 | 0.8 |
| Ref. Ex. 1 | B | no compacting treatment | | 0.75 | 650 | 30 | 385 | not kneaded |
| Ref. Ex. 2 | B | " | | 0.75 | 650 | 30 | 385 | 0.2 |
| Ref. Ex. 3 | B | 30 | 15 | 0.85 | 636 | 31 | 392 | 0.7 |
| Ref. Ex. 4 | B | no compacting treatment | | 0.75 | 650 | 30 | 385 | 0.2 |
| Ref. Ex. 5 | B | 30 | 15 | 0.85 | 636 | 31 | 392 | 0.7 |
| Ref. Ex. 6 | B | 30 | 15 | 0.85 | 636 | 31 | 392 | 0.7 |
| Ref. Ex. 7 | B | 40 | 30 | 1.10 | 621 | 33 | 372 | 1.4 |
| Ref. Ex. 8 | B | 30 | 15 | 0.85 | 636 | 31 | 392 | 0.7 |

| | Upper Magnetic Layer | | | | | | | |
|---|---|---|---|---|---|---|---|---|
| | Kind of Magnetic Substance | Compacting Treatment | | Tap Density (g/cc) | Coercive Force (Oe) | Specific Surface Area (m²/g) | Crystallite Size (Å) | Kneading Load Peak Power (kW) |
| | | Pressure (kg) | Time (min) | | | | | |
| Example 2 | A | 30 | 10 | 0.70 | 695 | 40 | 313 | 0.7 |
| Example 3 | A | 40 | 10 | 0.90 | 682 | 41 | 308 | 0.8 |
| Example 4 | A | 30 | 20 | 0.80 | 691 | 40 | 312 | 0.75 |
| Example 5 | C | 30 | 10 | 0.75 | 710 | 48 | 275 | 0.6 |
| Example 6 | A | 30 | 15 | 0.75 | 694 | 40 | 312 | 0.74 |

TABLE 2-continued

| | | | | | | | | |
|---|---|---|---|---|---|---|---|---|
| Example 7 | C | 30 | 20 | 0.83 | 682 | 48 | 275 | 0.8 |
| Example 8 | C | 30 | 20 | 0.80 | 685 | 48 | 275 | 0.8 |
| Ref. Ex. 1 | A | no compacting treatment | | 0.65 | 700 | 40 | 315 | not kneaded |
| Ref. Ex. 2 | A | " | | 0.65 | 700 | 40 | 315 | 0.24 |
| Ref. Ex. 3 | A | " | | 0.65 | 700 | 40 | 315 | 0.24 |
| Ref. Ex. 4 | A | 30 | 20 | 0.80 | 691 | 40 | 312 | 0.75 |
| Ref. Ex. 5 | A | 40 | 25 | 1.00 | 655 | 42 | 310 | 1.1 |
| Ref. Ex. 6 | A | 40 | 10 | 0.90 | 682 | 41 | 310 | 0.8 |
| Ref. Ex. 7 | A | 40 | 25 | 1.00 | 655 | 42 | 310 | 1.1 |
| Ref. Ex. 8 | C | 30 | 30 | 0.90 | 675 | 49 | 272 | 0.9 |

| | Single Layer Coating | | | | Multi-layer Coating |
|---|---|---|---|---|---|
| | Lower Magnetic Layer | | Upper Magnetic Layer | | Audio Reproducing Output |
| | SR | Bm (gauss) | SR | Bm (gauss) | (dB) |
| Example 2 | 0.84 | 1380 | 0.89 | 1650 | +0.6 |
| Example 3 | 0.83 | 1440 | 0.88 | 1730 | +0.9 |
| Example 4 | 0.84 | 1400 | 0.88 | 1680 | +0.7 |
| Example 5 | 0.84 | 1400 | 0.85 | 1700 | +0.6 |
| Example 6 | 0.84 | 1380 | 0.89 | 1660 | +0.7 |
| Example 7 | 0.84 | 1400 | 0.85 | 1730 | +0.7 |
| Example 8 | 0.89 | 1520 | 0.85 | 1730 | +1.0 |
| Ref. Ex. 1 | 0.72 | 1210 | 0.70 | 1420 | −3 |
| Ref. Ex. 2 | 0.78 | 1270 | 0.79 | 1550 | −2.7 |
| Ref. Ex. 3 | 0.84 | 1400 | 0.79 | 1550 | +0.4 |
| Ref. Ex. 4 | 0.78 | 1270 | 0.89 | 1680 | −2.0 |
| Ref. Ex. 5 | 0.84 | 1400 | 0.80 | 1810 | +0.5 |
| Ref. Ex. 6 | 0.84 | 1400 | 0.89 | 1700 | +0.5 |
| Ref. Ex. 7 | 0.80 | 1560 | 0.80 | 1810 | +0.2 |
| Ref. Ex. 8 | 0.84 | 1400 | 0.85 | 1800 | +0.5 |

It is apparent from Table 2 that the magnetic recording mediums of the present invention are excellent audio reproducing output.

In Reference Examples, either one or both of the magnetic substance of the lower magnetic layer and that of the upper magnetic layer has/have a tap density outside the scope of the present invention (Reference Examples 1, 2, 3, 5 and 7), or the tap density of the magnetic substance of the lower magnetic layer is smaller than that of the magnetic substance of the upper magnetic layer (Reference Examples 4, 6 and 8), and the magnetic recording mediums are inferior in audio reproducing output.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising two or more magnetic layers containing ferromagnetic particles dispersed in a binder provided on a non-magnetic substrate, characterized in that ferromagnetic particles having an adsorption moisture adjusted to not lower than 0.4 wt %, but not higher than 2.0 wt % by moisture conditioning are used in the upper layer of said magnetic layers and ferromagnetic particles having an adsorption moisture less than by at least 0.1 wt % than that of the ferromagnetic particles used in said upper layer are used in the lower layer of said magnetic layers.

2. A magnetic recording medium as in claim 1, wherein the ferromagnetic particles used in said lower magnetic layer have a tap density of not lower than 0.8 g/cc, but not higher than 1.0 g/cc, and the tap density of the ferromagnetic particles used in the lower magnetic layer are higher than that of the ferromagnetic substance used in the upper magnetic layer in such a proportion that a difference therebetween is 0.02 or more.

3. A magnetic recording medium as in claim 1, wherein the ferromagnetic particles used in the lower magnetic layer have a specific surface area of not higher than 45 $m^2$/g as measured by BET method and a crystallite size of not smaller than 290 Å and the ferromagnetic particles used in the upper magnetic layer have a specific surface area of not lower than 30 $m^2$/g as measured by BET method and a crystallite size of not larger than 400 Å.

4. A magnetic recording medium as in claim 1, wherein ferromagnetic particles having a water content adjusted within the range of from 0.8 to 2.0 wt % by moisture conditioning are used in the upper magnetic layer, and ferromagnetic particles having a water content of lower than 0.8 wt % and less by at least 0.1 wt % than that of the ferromagnetic particles used in the upper magnetic layer are used in the lower magnetic layer.

5. A magnetic recording medium as in claim 1, wherein the lower magnetic layer contains carbon black having an average particle diameter of smaller than 20 mµ in an amount of 1 to 20 parts by weight based on 100 parts by weight of the magnetic particles, and the upper magnetic layer contains carbon black having an average particle diameter of 40 to 80 mµ in an amount of 0.1 to 10 parts by weight based on 100 parts by weight of the magnetic particles.

6. A magnetic recording medium as in claim 1, wherein the lower magnetic layer has a thickness of not smaller than 2.5 µm and the upper magnetic layer has a thickness of not larger than 1.5 µm.

7. A magnetic recording medium as in claim 1, wherein the lower magnetic layer contains an abrasive having an Mohs' hardness of lower than 7 and the upper magnetic layer contains an abrasive having an Mohs' hardness of not lower than 7.

8. A magnetic recording medium as in claim 1, wherein the magnetic particles of the lower magnetic layer have a coercive force of not smaller than 600 Oe, the magnetic particles of the upper magnetic layer have a coercive force of not larger than 1000 Oe and the magnetic particles used in the lower and upper magnetic layers are cobalt-modified γ-FeOx (wherein x = 1.33 to 1.50).

* * * * *